US009457639B2

(12) United States Patent
Wang et al.

(10) Patent No.: US 9,457,639 B2
(45) Date of Patent: Oct. 4, 2016

(54) SYSTEM AND METHOD OF PROVIDING QUICK THERMAL COMFORT WITH REDUCED ENERGY BY USING DIRECTED SPOT CONDITIONING

(75) Inventors: Mingyu Wang, Amherst, NY (US); Prasad S. Kadle, Williamsville, NY (US); Debashis Ghosh, Williamsville, NY (US); Mark J. Zima, Clarence Center, NY (US); Edward Wolfe, IV, E Amherst, NY (US); Timothy D Craig, Williamsville, NY (US)

(73) Assignee: MAHLE International GmbH, Stuttgart (DE)

( * ) Notice: Subject to any disclaimer, the term of this patent is extended or adjusted under 35 U.S.C. 154(b) by 1044 days.

(21) Appl. No.: 13/442,961

(22) Filed: Apr. 10, 2012

(65) Prior Publication Data

US 2012/0276831 A1 Nov. 1, 2012

Related U.S. Application Data

(60) Provisional application No. 61/479,425, filed on Apr. 27, 2011, provisional application No. 61/499,312, filed on Jun. 21, 2011.

(51) Int. Cl.
*B60H 1/00* (2006.01)

(52) U.S. Cl.
CPC ...... *B60H 1/00742* (2013.01); *B60H 1/00871* (2013.01)

(58) Field of Classification Search
USPC .................................................. 454/75, 155
See application file for complete search history.

(56) References Cited

U.S. PATENT DOCUMENTS

| 3,814,001 A | * | 6/1974 | Hill | ................................ 454/154 |
| 5,145,112 A | * | 9/1992 | Ueda | ............................. 236/49.3 |

(Continued)

FOREIGN PATENT DOCUMENTS

| JP | 2006137364 | 6/2006 |
| JP | 2008175507 | 7/2008 |

OTHER PUBLICATIONS

Daly, Steven; "Automotive Air Conditioning and Climate Control Sytems," 2006 Elsevier ltd, pp. 18-21.*
Ruzic, Dragan; "Improvement of Thermal Comfort in a Passenger Car by Localized Air Distribution," ACTA Technica Corviniensis—Bulliten of Engineering, 2011, ISSN 2067-3809.*

(Continued)

*Primary Examiner* — Gregory Huson
*Assistant Examiner* — Martha Becton
(74) *Attorney, Agent, or Firm* — Brinks Gilson & Lione (57) ABSTRACT

A heating, ventilation, and air conditioning (HVAC) system and a method of controlling a HVAC system that is configured to provide a perceived comfortable ambient environment to an occupant seated in a vehicle cabin. The system includes a nozzle configured to direct an air stream from the HVAC system to the location of a thermally sensitive portion of the body of the occupant. The system also includes a controller configured to determine an air stream temperature and an air stream flow rate necessary to establish the desired heat supply rate for the sensitive portion and provide a comfortable thermal environment by thermally isolating the occupant from the ambient vehicle cabin temperature. The system may include a sensor to determine the location of the sensitive portion. The nozzle may include a thermoelectric device to heat or cool the air stream.

18 Claims, 8 Drawing Sheets

(56) References Cited

U.S. PATENT DOCUMENTS

| | | | |
|---|---|---|---|
| 5,187,943 A * | 2/1993 | Taniguchi et al. | 62/180 |
| 5,449,275 A | 9/1995 | Gluszek et al. | |
| 5,733,189 A * | 3/1998 | Eastwood | 454/155 |
| 6,659,358 B2 * | 12/2003 | Kamiya et al. | 236/49.3 |
| 6,715,689 B1 * | 4/2004 | Lee et al. | 236/49.3 |
| 6,736,341 B2 * | 5/2004 | Lind | 239/587.1 |
| 7,726,142 B2 | 6/2010 | Keen | |
| 8,855,825 B2 * | 10/2014 | Grohman | 700/276 |
| 2003/0172156 A1 | 9/2003 | Price et al. | |
| 2005/0098640 A1 * | 5/2005 | Ichishi et al. | 236/49.3 |
| 2008/0003938 A1 * | 1/2008 | Baruschke et al. | 454/143 |
| 2008/0248736 A1 | 10/2008 | Aoki et al. | |
| 2009/0098815 A1 | 4/2009 | Hotary | |
| 2010/0052374 A1 | 3/2010 | Bell et al. | |
| 2010/0274396 A1 | 10/2010 | Yang et al. | |
| 2011/0114739 A1 * | 5/2011 | Misumi et al. | 236/49.3 |
| 2014/0273785 A1 * | 9/2014 | Guillory et al. | 454/75 |

OTHER PUBLICATIONS

Modeling Thermal Comfort in Stratified Environments; H. Zhang, C. Huizenga, E. Arens, T. Yu; Proceedings of Indoor Air 2005, Beijing, pp. 133-137.

Predicting Human Thermal Comfort in a Transit Nonuniform Thermal Environment; John P. Rugh, Robert B. Farrington, Desikan Bharathan, Andreas Vlahinos, Richard Burke, Charlie Huizenga and Hui Zhang; 6 pages.

Thermal Sensation and Comfort Models for Non-Uniform and Transient Environments: Part 1: Local Sensation of Individual Body Parts; H, Zhang, E. Arens, C. Huizenga and T. Han; Jul. 1, 2009; Center for the Built Evenironment UC Berkeley; pp. 1-17.

Thermal Sensation and Comfort Models for Non-Uniform and Transient Environments: Part II: Local Comfort of Individual Body Parts; H. Zhang, E. Arens, C. Huizenga, T. Han; Jul. 1, 2009; Center for the Built Environment UC Berkeley; pp. 1-21.

EP Search Report Dated Sep. 26, 2013.

\* cited by examiner

SYSTEM AND METHOD OF PROVIDING QUICK THERMAL COMFORT WITH REDUCED ENERGY BY USING DIRECTED SPOT CONDITIONING

CROSS-REFERENCE TO RELATED APPLICATION

This application claims the benefit under 35 U.S.C. §119(e) of U.S. Provisional Patent Application No. 61/479,425. filed Apr. 27, 2011. the entire disclosure of which is hereby incorporated herein by reference. This application also claims the benefit under 35 U.S.C. §119(e) of U.S. Provisional Patent Application No. 61/499,312. filed Jun. 21, 2011. the entire disclosure of which is hereby incorporated herein by reference.

GOVERNMENT LICENSE RIGHTS STATEMENT

This invention was made with the United States Government support under Contract DE-EE0000014 awarded by the U.S. Department of Energy. The Government has certain rights in this invention.

TECHNICAL FIELD OF INVENTION

The present disclosure relates to an occupant thermal comfort system in a vehicle; more specifically, to a method of providing quick thermal comfort by using spot conditioning portions of the body of a vehicle occupant so the vehicle occupant perceives that the ambient temperature is comfortable. As used herein, the ambient temperature refers to the air temperature within the vehicle cabin, distinct from the air temperature exterior to the vehicle.

BACKGROUND OF INVENTION

Present vehicle heating, ventilation, and air conditioning (HVAC) systems in vehicles are configured to maintain thermal comfort of a vehicle occupant by providing a generally uniform thermal environment of, for example, about 24° C. within a vehicle cabin under all outside environmental conditions. A substantial percentage of the cooling or heating energy from the HVAC system is used to bring the thermal mass within the vehicle cabin to the desired temperature and to overcome the heat transfer from the vehicle cabin to the outside environment.

SUMMARY OF THE INVENTION

In accordance with one embodiment of this invention, a heating, ventilation, and air conditioning (HVAC) system that is configured to provide a perceived comfortable ambient environment to an occupant seated in a vehicle cabin is provided. The system includes a first nozzle that is configured to direct a first air stream from the HVAC system. The system also includes a servo mechanism that is coupled to the first nozzle and is configured to articulate the first nozzle in order to direct the first air stream to a desired location. The system further includes a controller that is in communication with the servo mechanism. The controller is configured to identify a sensitive portion of a body of the occupant that is more sensitive to heat loss than other portions of the body, determine an ambient temperature of the vehicle cabin, and determine a desired heat supply rate for the sensitive portion. As used herein, a portion of the body refers to a portion of the surface of the body, not an internal organ or an internal structure of the body. As used herein, the desired heat supply rate provides heating when it is positive in value, and supplies cooing when it is negative in value.

The desired heat supply rate includes a steady-state heat supply rate based on a difference between a comfortable heat loss rate for the sensitive portion and an actual heat loss rate for the sensitive portion at the ambient temperature. The desired heat supply rate may further include a transient heat supply rate for the sensitive portion. The transient heat supply rate may diminish in magnitude based on an elapsed time since a system start event. The controller is further configured to determine a comfortable skin temperature for the sensitive portion, determine a flow rate for a first air stream and a stream temperature for the first air stream. The flow rate and the stream temperature are based on, at least, the desired heat supply rate, the comfortable skin temperature, a discharge area of a nozzle, a dispersion angle of the nozzle, and a distance from the nozzle to the sensitive portion. The controller is also configured to determine a location of the sensitive portion and operate the servo mechanism to articulate the first nozzle in order to direct the first air stream to the location of the sensitive portion. The first air stream is characterized as having the stream temperature and the flow rate necessary to establish the desired heat supply rate for the sensitive portion.

In another embodiment of the present invention, the system further includes a sensor that is configured to determine a seated height of the occupant. The sensor is in communication with the controller. The controller is configured to determine the location of the sensitive portion based on the seated height indicated by the sensor.

In another embodiment of the present invention, the system further includes a sensor configured to determine a first seat position of a seat of the occupant. The sensor is in communication with the controller. The controller is configured to determine the location of the sensitive portion based on the first seat position indicated by the sensor.

In another embodiment of the present invention, the controller is configured to determine that a seat has moved from a first seat position to a second seat position and determine a second location of the sensitive portion based on the second seat position.

In yet another embodiment of the present invention, a method of controlling a heating, ventilation, and air conditioning system to provide a perceived comfortable ambient environment to an occupant seated in a vehicle cabin is provided. The method includes the steps of identifying a sensitive portion of a body of the occupant that is more sensitive to heat loss than other portions of the body, determining an ambient temperature of the vehicle cabin, and determining a desired heat supply rate for the sensitive portion. The desired heat supply rate includes a steady-state heat supply rate based on a difference between a comfortable heat loss rate for the sensitive portion and an actual heat loss rate for the sensitive portion at the ambient temperature. The desired heat supply rate may further include a transient heat supply rate for the sensitive portion. The transient heat supply rate may diminish in magnitude based on an elapsed time since a system start event. The method also includes the steps of determining a comfortable skin temperature for the sensitive portion and determining a flow rate for a stream of air and a stream temperature for the stream based on at least the desired heat supply rate, the comfortable skin temperature, a discharge area of a nozzle, a dispersion angle of the nozzle, and a distance from the nozzle to the sensitive portion. The method further includes the steps of determining a location of the sensitive portion and operating the nozzle to direct the stream to the location of the sensitive portion. The stream is characterized as having the stream temperature and the flow rate necessary to establish the desired heat supply rate at the sensitive portion.

Further features and advantages of the invention will appear more clearly on a reading of the following detailed description of the preferred embodiment of the invention, which is given by way of non-limiting example only and with reference to the accompanying drawings.

BRIEF DESCRIPTION OF DRAWINGS

The present invention will now be described, by way of example with reference to the accompanying drawings, in which.

DETAILED DESCRIPTION OF INVENTION

The thermal comfort of a vehicle occupant in a vehicle cabin may be primarily determined by the heat loss rate of the occupant. The occupant may typically be comfortable in an ambient temperature of about 24° C. Therefore, when the heat loss rate of the occupant is higher than when in an environment with an ambient temperature of 24° C., the occupant tends to feel cooler. When the heat loss rate of the occupant is lower than when in an environment with an ambient temperature of 24° C., the occupant tends to feel warmer.

Rather than maintaining the entire vehicle cabin at a comfortable ambient temperature of 24° C., it may be advantageous to just maintain the heat loss rate of the occupant at a rate that is equivalent to an ambient temperature of 24° C. (the desired or comfortable heat loss rate). The vehicle occupant may be effectively thermally isolated from the ambient temperature of the vehicle cabin by directing thermal energy to the vehicle occupant, in a non-limiting example by directing an air stream at a specific temperature and air flow rate so that the heat loss rate of the occupant is generally the same as would occur at an ambient temperature of 24° C. Alternatively, thermal energy may be directed toward the vehicle occupant by radiant, convective, or conductive means. The air stream may effectively isolate the occupant from the vehicle cabin ambient temperature.

Since the air stream may effectively thermally isolate the occupant from the vehicle cabin thermal environment, it may be possible to save energy by maintaining a higher ambient temperature (for situations when cooling is desired) or a lower ambient temperate (for situations when heating is desired) within the vehicle cabin. Is has been estimated that a 5% energy savings may be realized for every 1° C. increase in the ambient temperature of the vehicle cabin when cooling is desired. Energy savings for heating cabins of vehicles with internal combustion (IC) engines are usually lower since the energy used for heating is typically waste heat from the IC engine. However, in electrical vehicles that do not create a significant amount of waste heat, energy from the vehicle batteries must be supplied to heat the vehicle cabin; therefore similar energy savings for heating may be realized.

It has been observed that different portions or areas of a human body have different sensitivity to heat loss caused by the ambient temperature. For example, the human face is relatively insensitive to cold ambient temperatures within a reasonable range, while other body portions, such as feet have higher sensitivity to cold ambient temperatures. Therefore, it may be advantageous to direct thermal energy to portions of the occupant's body that are most sensitive, as a non-limiting example providing spot conditioning. As used herein, spot conditioning means directing a stream of air at a specific temperature and flow rate toward a sensitive portion of the occupant's body to provide a heat loss rate for the sensitive portion equivalent to the heat loss rate at a comfortable temperature, such as 24° C.

A model of a human body identifying thermal sensation and thermal comfort sensitivity of various body portions to temperature has been developed to determine which body portions to heat or cool to achieve thermal comfort through spot conditioning. As an illustrative example, the static local sensation equation by Zhang et al. ["Thermal Sensation and Comfort Models for Non-Uniform and Transient Environments: Part I: Local Sensation of Individual Body Parts", Indoor Environmental Quality (IEQ), Center for the Built Environment, Center for Environmental Design Research, University of California—Berkeley, 2009] may be used to determine the sensitivity of body portions to localized heating or cooling.

According to Zhang et al., ibid, a local static thermal sensation index for each body portion may be correlated to skin temperature via the following equation, $$LTI=4*((2/1+e^{\wedge}(-C1*(Tsk-Tskc)-K1*((Tsk-Tskc)-(Tavg-Tavgc)))-1)$$

LTI is the local thermal sensation index for a particular body portion. The value of the index ranges between −4 (very cold) to 4 (very hot) with zero (0) corresponding to a natural or comfortable thermal sensation. Tsk is the actual skin temperature of the particular body portion, Tskc is the comfortable skin temperature for that body portion, Tavg is the average skin temperature for the body and Tavgc is the average skin temperature for the body at a comfortable ambient temperature. The coefficient C1 represents the sensitivity to the skin temperature changes determined by a given ambient temperature. As non-limiting example, the coefficient C1 may be used as a selection criterion for sensitive body portions.

Figure 1:
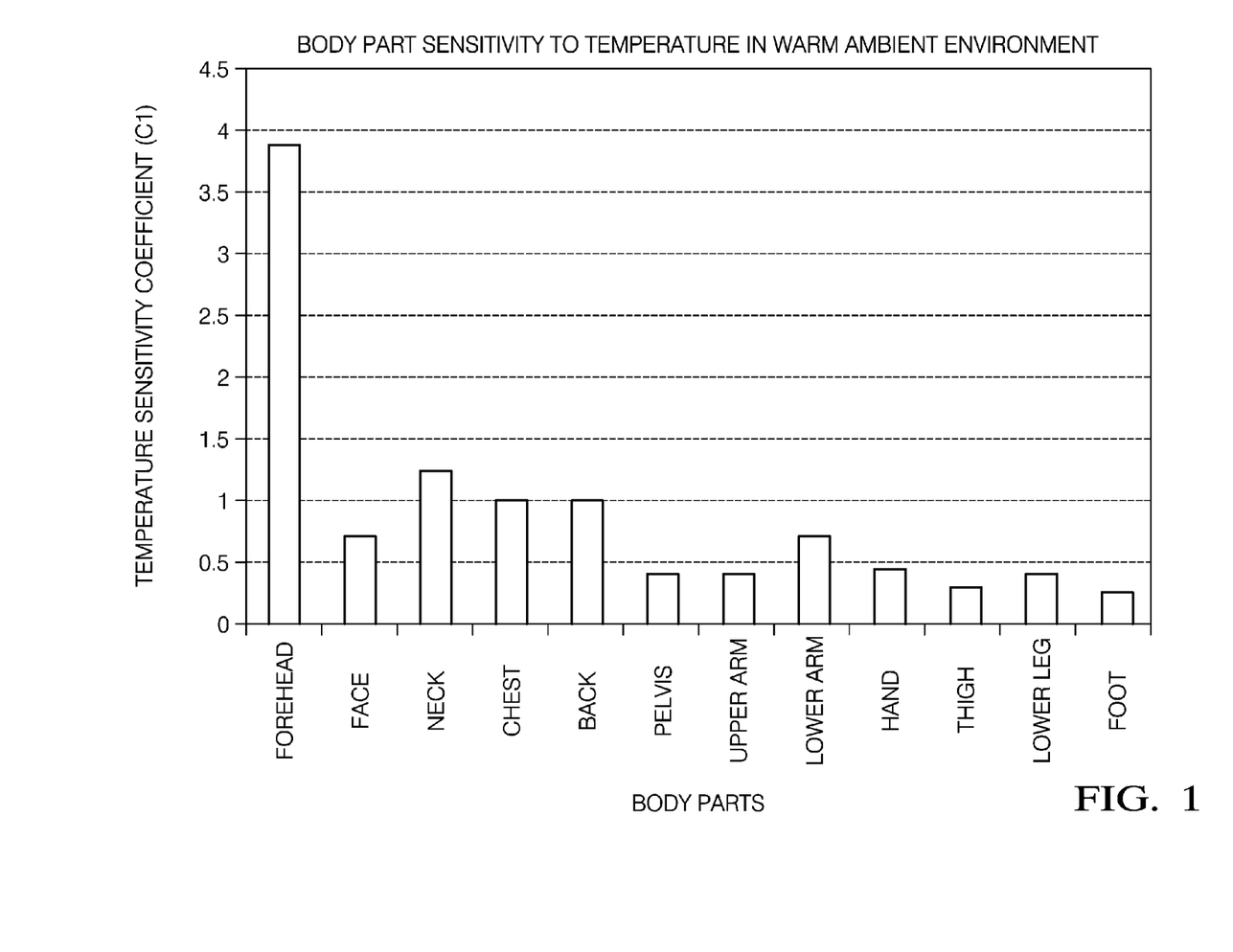
FIG. 1 is a graph illustrating a relative thermal sensitivity of various human body portions in a high ambient temperature environment.

FIG. 1 illustrates the coefficient C1 for various body portions in high ambient temperature conditions, thus being relevant to cooling. It can be seen that the forehead, neck, chest, back and lower arms are the more sensitive body portions to temperature in warmer environments and may be considered for spot conditioning for occupant cooling.

Figure 2:
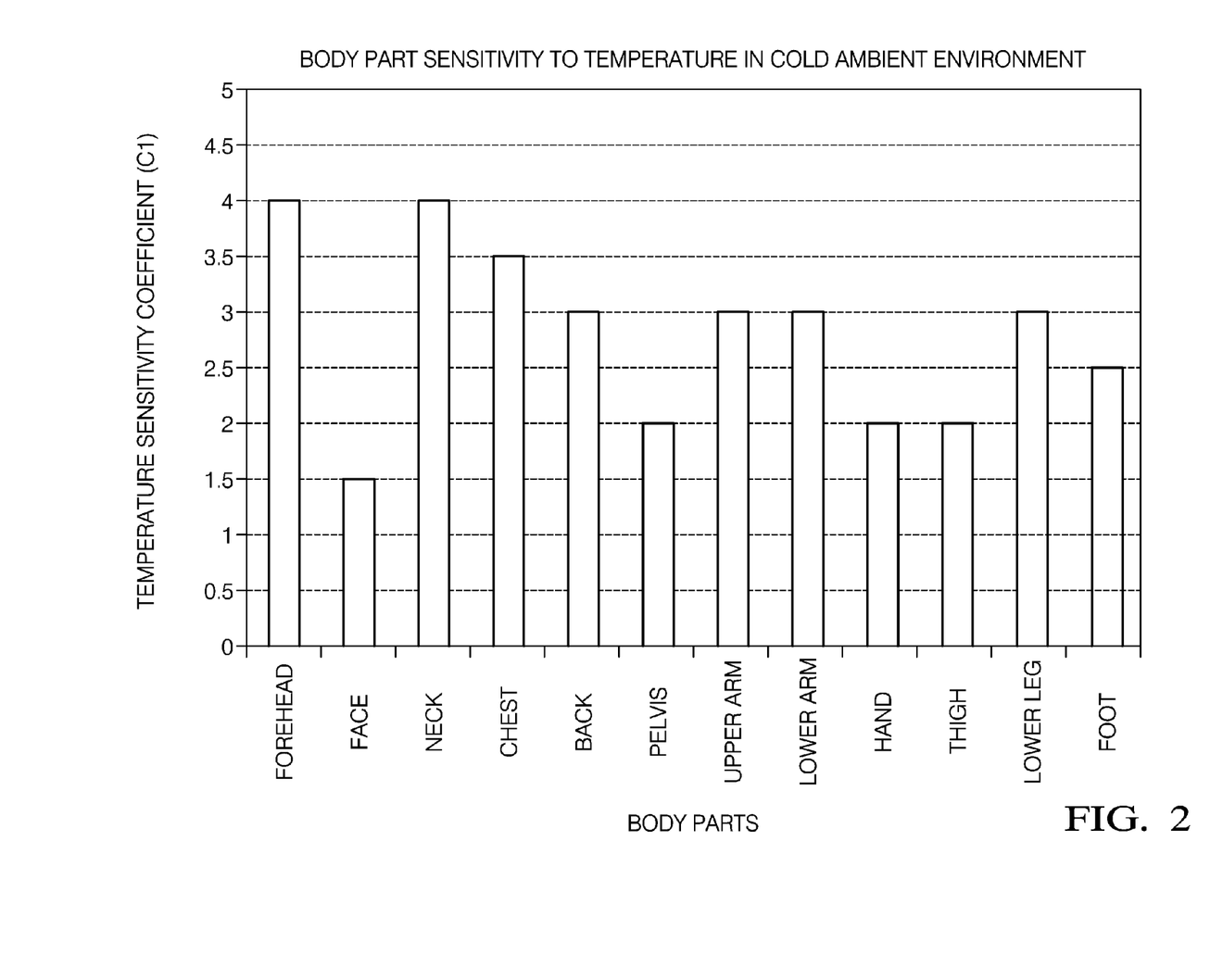
FIG. 2 is a graph illustrating a relative thermal sensitivity of various human body portions in a low ambient temperature environment.

FIG. 2 illustrates the coefficient C1 for various body portions in low ambient temperature conditions which are pertinent to comfort heating. It can be seen that the forehead, neck, chest, back, lower arms and legs are the more sensitive body portions to temperature in cooler environments may be considered for spot conditioning for occupant heating.

Depending on the strictness of the comfort maintenance requirements, more or fewer body portions may be selected for spot conditioning. Better thermal comfort may be achieved by spot conditioning of more of the body portions, while better energy efficiency of the HAVC system may be achieved by spot conditioning fewer body portions.

For an electrical vehicle (EV) or plug-in hybrid electric vehicle (PHEV), it may be possible to correlate the number of spot conditioned body portions to the remaining battery capacity or to the electric driving range. When electric driving range is of primary concern, spot conditioning may be delivered to fewer sensitive portions. As the battery is being depleted, the number of sensitive portions spot conditioned can be further reduced.

Human thermal comfort may be best achieved at an ambient air temperature of 24° C., and may be used as a baseline for heat loss rate. In this comfortable thermal environment, body portions dissipate heat generated by metabolic activities to the environment. The heat loss rate at 24° C. is a comfortable heat loss rate that may be designated as Qc. The actual heat loss rate for various body portions at various ambient temperatures may be determined experimentally or through computational fluid dynamics analysis.

When the ambient temperature is lower than the reference ambient temperature of 24° C., the heat loss rate from the various body portions will be greater than the baseline rate at 24° C. At the ambient temperature of Ta, the actual heat loss rate may be designated Qact. The difference Qss between the comfortable heat loss rate Qc and the actual heat loss rate Qact is the rate at which thermal energy must be delivered to a particular body portion to maintain comfort in steady-state conditions. As used herein, Qss is referred to as the desired steady state heat supply rate.

Figure 3:
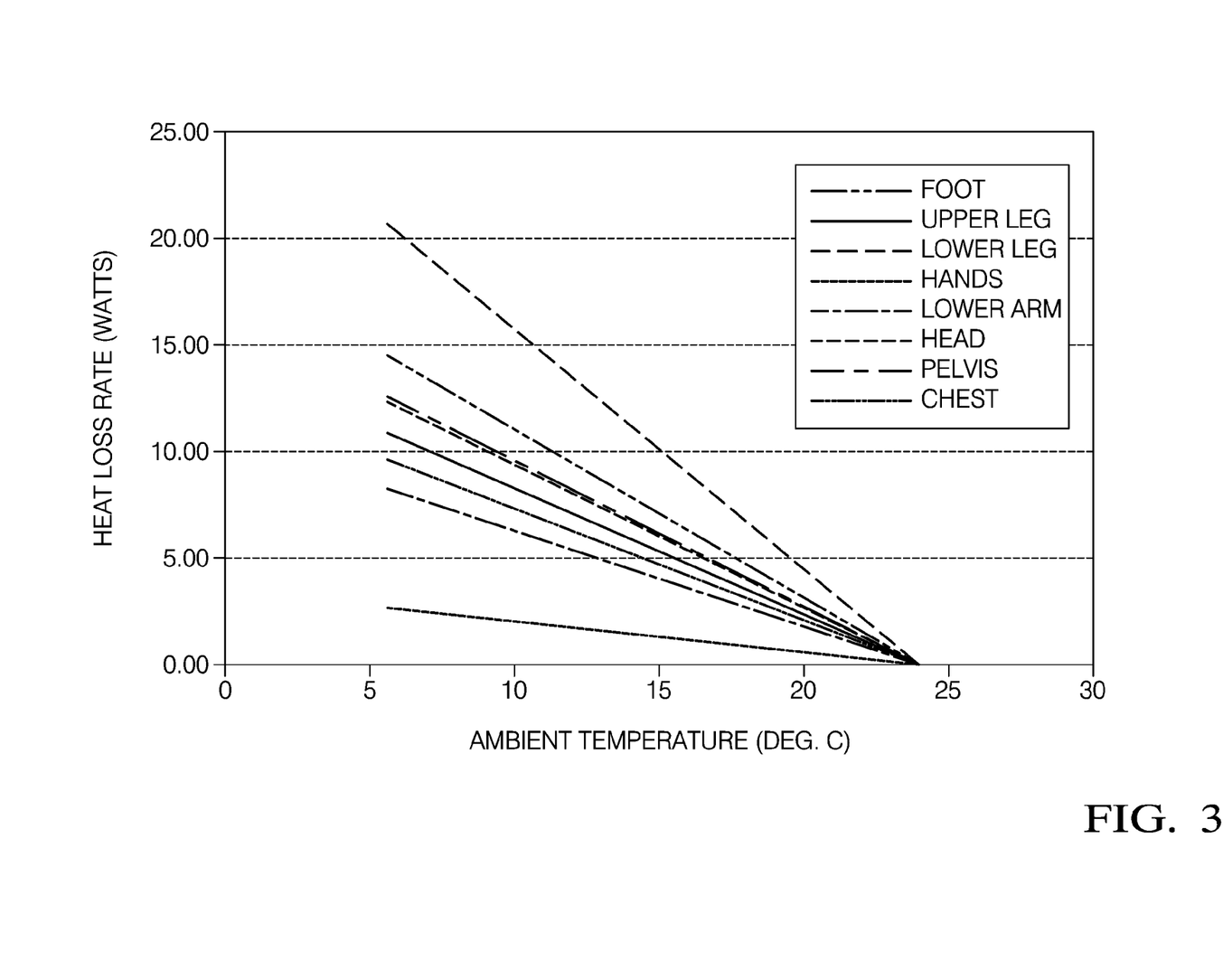
FIG. 3 is a graph illustrating a difference between actual heat loss rates of various body portions in an environment between 6° C. and 24° C., and the comfortable heat loss rates occurring nominally at 24° C.

FIG. 3 illustrates the difference between the heat loss rate Qact and the comfortable heat loss rate Qc for various body portions as the ambient temperature increases from 6° C. to 24° C. As the ambient temperature decreases, the actual heat loss rate of each body portion increases and more heating is required for the body portions to remain comfortable. Similar graphs may be generated for temperatures above 24° C. For steady-state thermal comfort, comfort maintenance requirement may be met when the heating or cooling delivered is equal to the difference between the heat loss rate Qact and the comfortable heat loss rate Qc.

Figure 4:
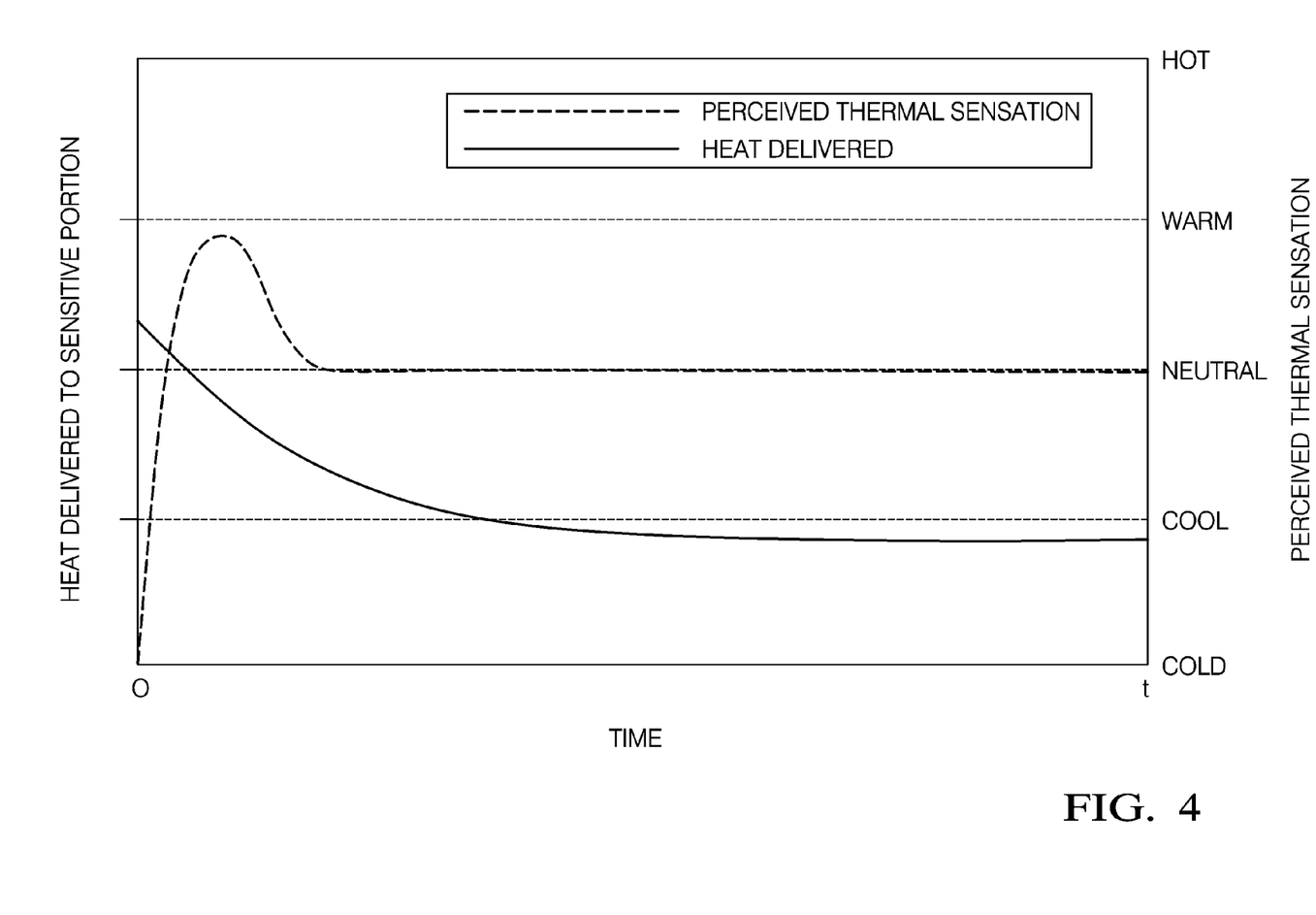
FIG. 4 is a graph illustrating transient over-conditioning of a sensitive portion and the resultant perceived thermal sensation.

FIG. 4 illustrates that it may be desirable to provide over-conditioning of the sensitive portions by modifying the desired heat supply rate to achieve quicker comfort for an initial time period before scaling back to the steady-state heat supply rate Qss. As used herein, over-conditioning means providing a heat supply rate for the sensitive portion greater than the steady-state heat supply rate to achieve overall thermal comfort quickly. In the non-limiting example shown in FIG. 4, heating is delivered to the sensitive portion provide an initial over-heating of the sensitive portion before scaling back to steady state heating. The initial heat supply rate is greater than the steady state heat supply rate by the amount represented by Qt. The amount of heating delivered to the sensitive portion is reduced over time until the heat supply rate of the sensitive portion is equal to the steady state heat supply rate. This may be beneficial when the occupant enters a cold soaked car on a cold winter night. Alternately, providing a greater negative heat supply rate than the steady-state supply rate may be beneficial when the occupant enters a hot soaked car on a high temperature summer day with strong solar exposure. Therefore the desired heat supply rate (Qd) may include a steady-state component (Qss) and a transient component (Qt).

Figure 5:
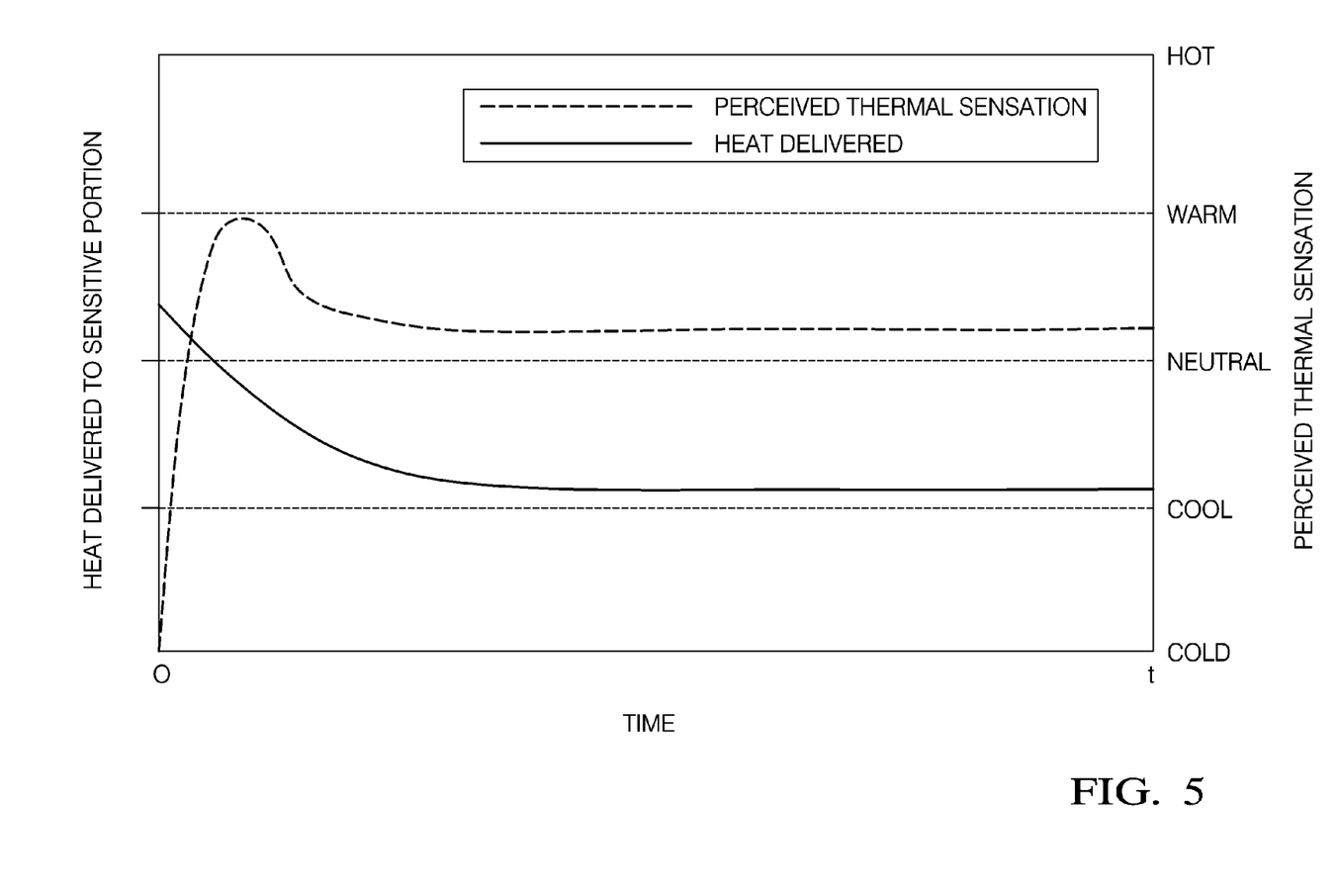
FIG. 5 is a graph illustrating continued over-conditioning of a sensitive portion and the resultant perceived thermal sensation.

FIG. 5 illustrates that for energy efficient operation of the HVAC system and enhanced comfort in steady-state operation, the number of the spot conditioned body portions may be reduced by focusing on a few of the most thermally sensitive portions, instead of all the body portions, and over-condition only the selected sensitive portions. In the non-limiting example shown in FIG. 5, a number of sensitive portions may be over-conditioned beyond basic comfort during the transient phase of the spot conditioning to such an extent that the sensitive portions may feel slightly overheated when the system is providing heating. Additionally, when the vehicle cabin achieves a steady state ambient temperature, instead of returning to a neutral thermal state (i.e. where the heat supply rate is equal to the difference between Qc and Qact), the sensitive portions may remain slightly over-conditioned to allow the cabin ambient temperature control to be more relaxed (under-conditioned), so that both improved overall body comfort and reduced overall energy consumption may be obtained due to the smaller body portion set. A number of sensitive portions may be similarly over-conditioned for cooling.

Figure 6:
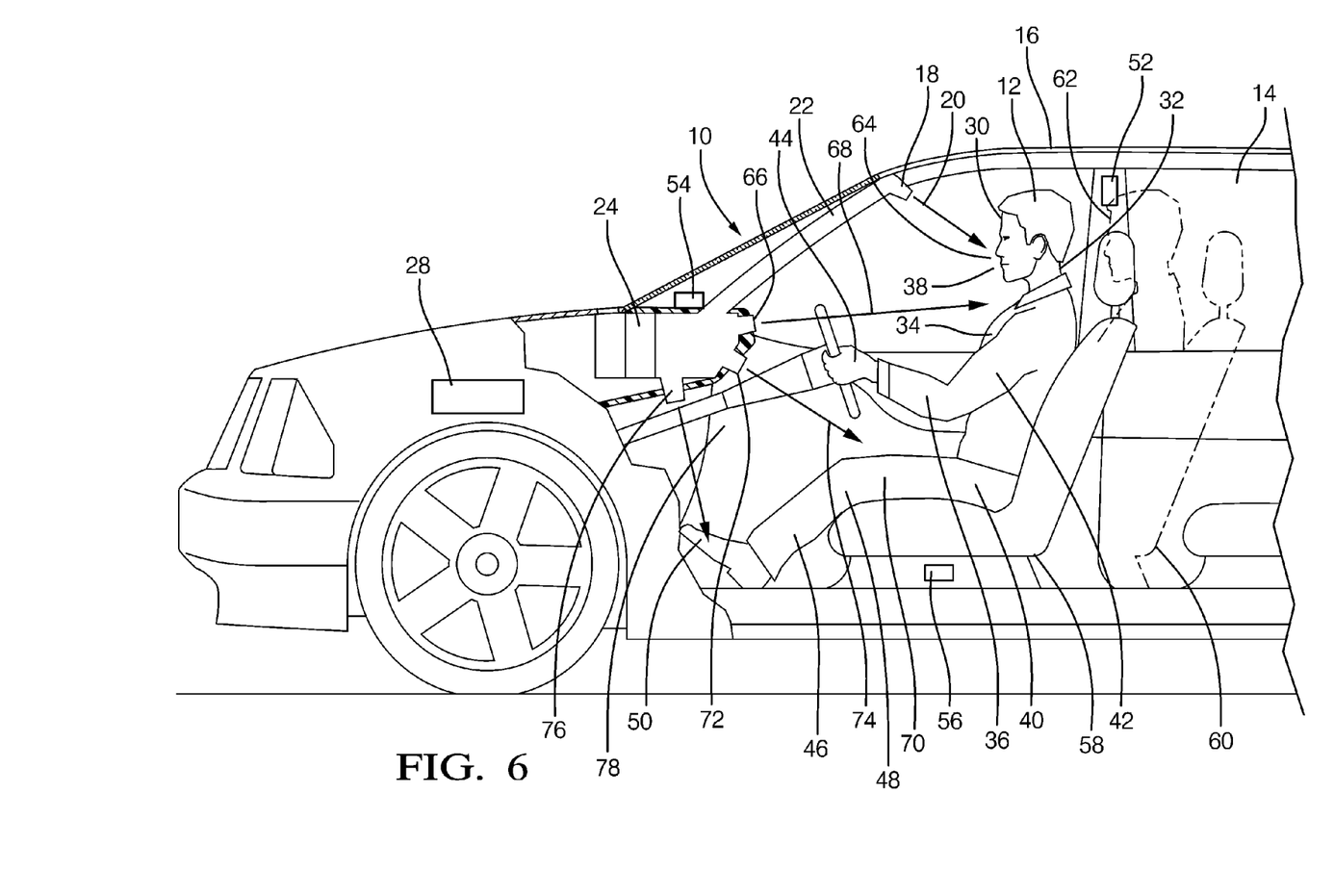
FIG. 6 is a cutaway side view diagram of a vehicle equipped with an HVAC system configured to provide a perceived comfortable ambient environment to an occupant in accordance with one embodiment.

FIG. 6 illustrates a non-limiting example of a heating, ventilation, and air conditioning system 10 that is configured to provide a perceived comfortable ambient environment to an occupant 12 seated in a cabin 14 of a vehicle 16. The system 10 includes a first nozzle 18 that is configured to direct a first air stream 20 from the HVAC system 10. The system 10 may also include an air plenum 22 that is configured to direct air that has been heated or cooled by a heat exchanger 24, such as an evaporator, a heater core, or a thermoelectric device within the HVAC system 10 to the first nozzle 18. The system 10 may further include an air movement device such as a fan to force air from the cabin 14 or outside of the vehicle 16 through the heat exchanger 24 and through the first nozzle 18.

Alternatively, the HVAC system 10 may include a thermoelectric device that is disposed in proximity to the first nozzle 18. The thermoelectric device may be configured to heat or cool air drawn though the hvac system 10. The HVAC system 10 may also include a fan or another air movement device that is configured to draw vehicle cabin 14 air into the HVAC system 10 and force it past the thermoelectric device and through the first nozzle 18.

Figure 7:
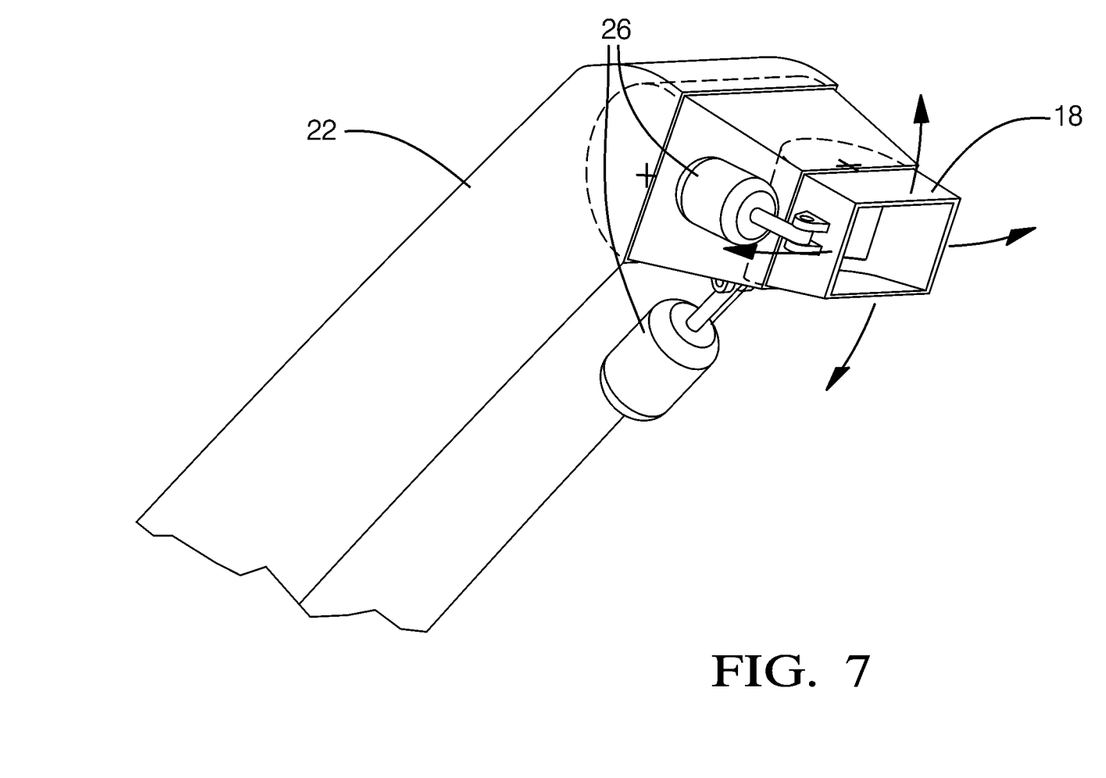
FIG. 7 is a side view of a nozzle and a servo mechanism of an HVAC system in accordance with one embodiment.

FIG. 7 illustrates a non-limiting example of the first nozzle 18 that includes a servo mechanism 26 that is mechanically coupled to the first nozzle 18. The servo mechanism 26 is configured to articulate the first nozzle 18 in order to direct the first air stream 20 to a desired location within the vehicle cabin 14. As used herein, articulate refers to moving the nozzle in one or more axes in order to direct the first air stream 20. The first nozzle 18 may have freedom of movement in one or preferably two axes, such as when mounted in a gimbal device. The nozzle may also be configured to move fore and aft, that is extend and retract as well as move up/down and right/left. The servo mechanism 26 may include a servo motor with a ball and screw drive or a stepper motor. The servo mechanism 26 may be configured to maintain direction of the first air stream 20 to the desired location, such as a specific portion of the body of the occupant 12 rather than sweep the first air stream 20 over various portions of the body of the occupant 12.

The first nozzle 18 may also be a fixed nozzle that is configured to direct the first air stream 20 to a single location within the vehicle cabin 14. A dispersion angle of the first nozzle 18 may be selected so that the first air stream 20 covers the sensitive portion 30 of an occupant 12 ranging from a $10^{th}$ percentile female occupant to a $90^{th}$ percentile male occupant. The first nozzle 18 may also be configured to be manually directed toward the sensitive portion 30 by the occupant 12, without the servo mechanism 26 articulating the first nozzle 18 in order to direct the first air stream 20 to the location of the sensitive portion 30.

Referring again to FIG. 6, the HVAC system 10 further includes a controller 28 in communication with at least the servo mechanism 26. The controller 28 may include a microprocessor or application specific integrated circuit (ASIC) configured to control the servo mechanism 26. Software that configures the microprocessor or ASIC to control the servo mechanism 26 may be stored in non-volatile (NV) memory within the controller 28. Non-limiting examples of the types of NV memory that may be used include electrically erasable programmable read only memory (EEPROM), masked read only memory (ROM) and flash memory. The controller 28 may also include analog to digital (A/D) convertor circuits and digital to analog (D/A) convertor circuits to allow the convertor to establish electrical communication with the servo mechanism 26 and other electronic devices, such as sensors.

The software may also include instructions that, when executed, cause the controller 28 to identify a sensitive portion 30 of a body of the occupant 12 that is more sensitive to heat loss than other portions of the body. The sensitive portion 30 identified may depend whether the occupant 12 is in a high ambient temperature environment where the heat loss rate needs to be increased to maintain comfort, that is the system 10 is providing cooling of the occupant 12 or in a lower ambient temperature environment where the heat loss rate needs to be lowered in order to maintain comfort, that is the system 10 is providing heating to the occupant 12. In a non-limiting example, in a higher ambient temperature environment the sensitive portion 30 may be, in order of decreasing sensitivity, a forehead portion 30, a neck portion 32, a chest portion 34, a lower arm portion 36, a face portion 38, a pelvis portion 40, an upper arm portion 42, a hand portion 44, a lower leg portion 46, a thigh portion 48 or a foot portion 50. In another non-limiting example, in a lower ambient temperature environment the sensitive portion 30 may be, in order of decreasing sensitivity, a forehead portion 30, a neck portion 32, a chest portion 34, a lower arm portion 36, an upper arm portion 42, a lower leg portion 46, a foot portion 50, a pelvis portion 40, a hand portion 44, a thigh portion 48, or a face portion 38.

The identification of sensitive body portions may be based upon models of the human body such as the Human Thermal Comfort Model developed by Zhang et al., ibid to determine thermal comfort sensitivity of body portions to the ambient temperature. The controller 28 may include a database of the temperature sensitivity of various body portions stored in the memory of the controller 28.

The controller 28 is configured to determine an ambient temperature of the vehicle cabin 14. The system 10 may include a temperature sensor 52 that is disposed within the vehicle cabin 14. The controller 28 may be in electrical communication with the temperature sensor 52. The temperature sensor 52 may be configured to measure the ambient air temperature within the cabin 14. Alternatively, the system 10 may include a plurality of temperature sensors in order to determine a local ambient temperature in various location of the vehicle cabin 14 and/or to determine an average ambient temperature.

The controller 28 is configured to determine a desired heat supply rate (Qd) for the sensitive portion 30. The desired heat supply rate includes a steady-state heat supply rate (Qss) and a transient heat supply rate (Qt). The desired heat supply rate may be determined by the formula Qd=Qss+Qt.

The steady-state heat supply rate is based on a difference between the comfortable heat loss rate (Qc) for the sensitive portion 30 and an actual heat loss rate (Qact) for the sensitive portion 30 at the ambient temperature. The steady-state heat supply rate may be determined by the formula Qss=Qc−Qact. The controller 28 may include a database containing the comfortable heat loss rate (Qc) for each of the sensitive portions database stored in the memory of the controller 28. The controller 28 may also include a database stored in the memory of the controller 28 containing and the actual heat loss rate (Qact) for each of the sensitive portions at various ambient temperatures. The controller 28 may be configured to interpolate a value for the actual heat loss rate when the ambient temperature is not contained in the database. Alternatively, the HVAC system 10 may include a thermal sensor, such as an infrared imaging sensor, in communication with the controller 28. The thermal sensor may be configured to determine the actual heat loss rate (Qact) of the sensitive portion 30.

The transient heat supply rate may diminish in magnitude based on an elapsed time since a system 10 start event. The transient heat supply rate may be determined by the formula Qt=Qdelta(1−e^(−ct)), where Qdelta is typically less than 100% of the steady-state heat supply rate Qss. Qdelta may be a function of the initial ambient temperature within the vehicle cabin 14. e is the mathematic constant 'e', also known as Euler's number or Napier's constant, c is a calibrateable time constant, and t is the elapsed time since the system 10 start event. The value of the time constant c is typically based upon the value of Qdelta and the initial ambient temperature within the vehicle cabin 14. The diminishing of the transient heat supply rate may alternatively be based on other mathematical formulae.

The controller 28 is further configured to determine a comfortable skin temperature for the sensitive portion 30 of the body of the occupant 12. The comfortable skin temperature may also be based on models of the human body such as the Human Thermal Comfort Model developed by Zhang et al., ibid. The controller 28 may include a database of comfortable skin temperatures for various body portions stored in the memory of the controller 28 database stored in the memory of the controller 28.

The controller 28 is configured to determine a flow rate for a first air stream 20 discharged from the HVAC system 10 and a stream temperature for the first air stream 20 discharged from the HVAC system 10. The flow rate and stream temperature are based on at least the desired heat supply rate, the comfortable skin temperature, a discharge area of a nozzle, a dispersion angle of the nozzle, and a distance from the nozzle to the sensitive portion 30. The flow rate and the stream temperature may be determined by the formula Qd=K*(Rf*(Tst−Tskc/A*alpha*L), where Qd is the desired heat supply rate, Tst is the stream temperature, Rf is the flow rate, Tskc is the comfortable skin temperature, A is a discharge area of the nozzle, alpha is the dispersion angle of the nozzle, L is the distance from the nozzle to the sensitive portion 30, and K is a calibration constant. The value of the calibration constant K may be determined experimentally and is dependent on the stream temperature and the flow rate. It is to be noted that there may be a multitude of combinations of flow rate and stream temperature that can provide the desired heat supply rate. The flow rate and stream temperature may also be bounded because flow rates that are too high as well as stream temperatures that are too high or too low may cause discomfort to the occupant 12.

The distance (L) from the first nozzle 18 to the sensitive portion 30 needs to be optimized. As the first air stream 20 passes through the vehicle cabin 14, air that is at the ambient temperature may be entrained in the first air stream 20. As the distance L increases, more cabin air may be entrained in the first air stream 20 which may significantly alter the temperature of the first air stream 20 delivered to the sensitive portion 30. As the distance L decreases, the surface velocity of the first air stream 20 on the sensitive portion 30 may be high enough to cause discomfort to the occupant 12.

The controller 28 is configured to determine a location of the sensitive portion 30 within the vehicle cabin 14. The controller 28 may include a database of location information of the sensitive body portions in relation to the first nozzle 18, as a non-limiting example azimuth and distance information. The controller 28 may utilize this location information to command the servo mechanism 26 to direct the first nozzle 18 to deliver the first air stream 20 to a sensitive portion 30 of the body of the occupant 12. The location information may be generalized so that the location information encompasses the location of the sensitive portion 30 of a female occupant in the $10^{th}$ percentile of height and a male occupant in the $90^{th}$ percentile of height.

Continuing to refer to FIG. 6, the system 10 may further include a sensor 54 that is configured to determine a seated height of the occupant 12. The seated height sensor 54 may be in communication with the controller 28. The controller 28 may be configured to determine the location of the sensitive portion 30 of the body of the occupant 12 based on the seated height indicated by the seated height sensor 54. The controller 28 may include a database of location information of the sensitive body portions correlated to the seated height of the occupant 12. Such a database may be generated based on anthropometric data, such as that contained in Chapter 11 of "Human Engineering Guide to Equipment Design" Harold P Van Cott and Robert G Kinkade, ed., American Institutes for Research, 1972. The seated height sensor 54 may provide an advantage of directing the first air stream 20 more precisely to the sensitive portion 30. This may allow the first nozzle 18 to have a narrower dispersion angle, which will reduce the entrainment of ambient cabin air in the first air stream 20. It may also allow the flow rate of the first air stream 20 to be reduced, thereby reducing energy required for an air movement device and beneficially reducing noise from the HVAC system 10.

The system 10 may further include a sensor 56 configured to determine a first seat position 58 of a seat of the occupant 12. The seat position sensor 56 may be in communication with the controller 28. The controller 28 may be configured to determine the location of the sensitive portion 30 based on the first seat position 58 indicated by the seat position sensor 56. The controller 28 may be further configured to determine a leg length of the occupant 12 based on the seat position of the occupant 12 and determine the location of the sensitive portion 30 based on the leg length of the occupant 12. The controller 28 may include a database of leg length of the occupant 12 based on seat position and location information of the sensitive body portions correlated to the leg length of the occupant 12. Such a database may be generated based on anthropometric data, such as that contained in Chapter 11 of "Human Engineering Guide to Equipment Design", ibid. The seat position sensor 56 may provide an advantage of directing the first air stream 20 more precisely to the sensitive portion 30. This may allow the first nozzle 18 to have a narrower dispersion angle, which will reduce the entrainment of ambient cabin air in the first air stream 20. It may also allow the flow rate of the first air stream 20 to be reduced, thereby reducing energy required for an air movement device and beneficially reducing noise from the HVAC system 10.

The controller 28 may be configured to determine that a seat has moved from a first seat position 58 to a second seat position 60 and determine a second location 62 of the sensitive portion 30 based on the second seat position 60.

The controller 28 is configured to operate the servo mechanism 26 to articulate the first nozzle 18 in order to direct the first air stream 20 to the location of the sensitive portion 30. The first air stream 20 discharged from the HVAC system 10 is characterized as having the stream temperature and the flow rate necessary to establish the desired heat supply rate at the sensitive portion 30 to heat or cool the occupant 12 in order to provide a perceived comfortable ambient environment to the occupant 12 seated in the vehicle cabin 14.

When the desired heat supply rate is established for the sensitive portion 30 through spot conditioning, the sensitive portion 30 may be effectively thermally isolated from the ambient temperature in the vehicle cabin 14. Therefore, it may no longer be necessary to maintain the entire cabin 14 at a comfortable ambient temperature of 24° C. in order provide thermal comfort for the sensitive portion 30. The vehicle ambient temperature may be maintained at a temperature higher (for cooling) or lower (for heating) while still maintaining occupant comfort. This may provide a benefit of reducing HVAC system energy consumption because less energy may be expended for maintaining the vehicle cabin temperature. There may also be less energy expended brining the thermal mass of the cabin 14 to the cabin ambient temperature.

For example, typically an energy saving of 5% per 1° C. increase over 24° C. in cabin temperature may be realized in automotive air conditioning (cooling) systems. The energy required to cool the first air and provide the first flow rate may be much less than the energy saved by increasing the cabin ambient temperature. Similar savings may be seen in electric vehicles by decreasing the cabin temperature for heating. Unlike IC engine vehicles that use engine waste heat to heat the vehicle cabin 14, electric vehicles typically use energy from the vehicle batteries to heat the cabin 14.

The first nozzle 18 may be preferably configured to deliver a substantially laminar flow rather than a turbulent flow in order to minimize entrainment of ambient air that may alter the temperature and the flow rate of the first air stream 20 delivered to the sensitive portion 30.

The first nozzle 18 may also include a nozzle control device in order to control the flow rate, discharge area, or dispersion angle of the nozzle. The nozzle control device may be an iris within the nozzle.

Based on test results, it was determined that the optimum distance from the first nozzle 18 to the sensitive portion 30 (L) was dictated by air entrainment and air flow spread on the sensitive portion 30. If the first nozzle 18 was positioned too far from the sensitive portion 30, then the first air stream 20 contained enough entrained cabin air at the ambient temperature to significantly reduce the efficacy of the spot conditioning. The distance (L) in combination with the dispersion angle (alpha) determined the air flow spread on the sensitive portion 30. The first nozzle 18 was configured to have a wide air flow spread on the sensitive portion 30.

Based on test results, air impingement velocities of the first air stream 20 on the sensitive portion 30 also need to be considered. Air impingement velocities, especially when the sensitive portion 30 was the face portion 38, were considered uncomfortable by the occupant 12 when velocities were too high. Also, the first air stream 20 was considered to be less comfortable when the first air flow was flowing up over the face portion 38 rather than flowing down over the face portion 38.

As illustrated in FIG. 6, the sensitive portion 30 may be a head portion 64. The head portion 64 may include the face portion 38 and the forehead portion 30. The first nozzle 18 may be a head nozzle 18. The first air stream 20 from the head nozzle 18 may be a head air stream 20 and may encompass both the face portion 38 and the forehead portion 30. The head nozzle 18 may be characterized as having a head nozzle 18 discharge area between 1.25 and 12 square centimeters and a head nozzle to head portion distance between 4 times a nozzle equivalent diameter and 10 times the nozzle equivalent diameter. For cooling, a head nozzle 18 flow rate may preferably be between 0.9 liters per second (2 cubic feet per minute (CFM) and 3.3 liters per second (12 CFM) and a head nozzle 18 stream temperature may preferably be between 22° C. and 26° C. The head nozzle 18 is preferably configured so that the first air stream 20 flows down (from forehead to chin) over the face portion 38 rather than up (from chin to forehead) over the face portion 38.

The head nozzle 18 may be preferably disposed above the head of the occupant 12 within the vehicle cabin 14. The head nozzle may be located in a headliner of the vehicle cabin 14. The head nozzle 18 may also be located in an overhead console in the vehicle cabin 14.

The nozzle equivalent diameter for a nozzle with a circular discharge portion is the actual diameter of the discharge portion. The nozzle equivalent diameter (Dh) for a nozzle with a discharge portion with a shape that is other than circular is 4 times the area of the discharge portion (A) divided by the perimeter of the discharge portion (P), that is Dh=4A/P, also known as the hydraulic diameter.

Based on test results, it was determined that satisfactory cooling in a vehicle cabin 14 with an ambient temperature of 28° C. and 31° C. was achieved by directing separate air streams to at least one of the head portion 64, the chest portion 34, and the lap portion 70 where the nozzle discharge areas, nozzle to portion distance, flow rates and stream temperatures are as characterized infra.

The sensitive portion 30 may be the chest portion 34 and the first nozzle 18 may be a chest nozzle 66. The first air stream 20 from the chest nozzle 66 may be a chest air stream 68. The chest nozzle 66 may be characterized as having a chest nozzle discharge area between 1.25 and 20 square centimeters and a chest nozzle to chest portion distance between 8 times a nozzle equivalent diameter and 15 times the nozzle equivalent diameter. For cooling, a chest nozzle flow rate may preferably be between 3.8 liters per second (8 CFM) and 7.6 liters per second (16 CFM) and a chest nozzle stream temperature may preferably be between 22° C. and 26° C. For heating, a chest nozzle flow rate may preferably be between 3.8 liters per second (5 CFM) and 7.6 liters per second (12 CFM) and a chest nozzle stream temperature may preferably be between 30° C. and 45° C. The chest nozzle may be located within an instrument panel.

The chest nozzle 66 may be preferably disposed in front of the occupant 12 within the vehicle cabin 14. The chest nozzle 66 may be located in an instrument panel or in the headliner of the vehicle 16. The chest nozzle 66 may be located within a seat back when the occupant 12 is sitting in a rear seat or a third row seat of the vehicle 16.

The sensitive portion 30 may be a lap portion 70. The lap portion 70 may include the pelvis portion 40 and the thigh portion 48. The first nozzle 18 may be a lap nozzle 72. The first air stream 20 from the lap nozzle 72 may be a lap air stream 74. The lap nozzle 72 may be characterized as having a lap nozzle 72 discharge area between 10 and 45 square centimeters and a lap nozzle to lap portion distance between 8 times a nozzle equivalent diameter and 15 times the nozzle equivalent diameter. For cooling, a lap nozzle flow rate may preferably be between 2.5 liters per second (5.3 CFM) and 14.5 liters per second (30 CFM) and a lap nozzle stream temperature may preferably be between 22° C. and 26° C. For heating, the lap nozzle flow rate may preferably be between 3 liters per second (6 CFM) and 14.5 liters per second (30 CFM) and the lap nozzle stream temperature may preferably be between 30° C. and 45° C.

The lap nozzle 72 may be preferably disposed in front of the occupant 12 within the vehicle cabin 14. The lap nozzle 72 may be located in an instrument panel of the vehicle 16 when the occupant 12 is seated in a front seat of the vehicle 16. The lap nozzle 72 may be located within a seat back when the occupant 12 is sitting in a rear seat or a third row seat of the vehicle 16.

The sensitive portion 30 may be a foot portion. The first nozzle 18 may be a foot nozzle. The first air stream 20 from the foot nozzle may be a foot air stream. The foot nozzle may be characterized as having a foot nozzle discharge area between 3 and 12.5 square centimeters. For heating, the foot nozzle flow rate may preferably be between 2.3 liters per second (5 CFM) and 9.5 liters per second (20 CFM) and the lap nozzle stream temperature may preferably be between 35° C. and 55° C.

There may preferably be a foot nozzle for each foot of the occupant. The foot nozzle may be located in an instrument panel of the vehicle 16 when the occupant 12 is seated in a front seat of the vehicle 16. The foot nozzle may be located under a seat when the occupant 12 is sitting in a rear seat or a third row seat of the vehicle 16.

The system 10 may further include a second nozzle 76 that is configured to direct a second air stream 78 from the HVAC system 10. The second air stream 78 may be provided to maintain the ambient temperature within the vehicle cabin 14. The second air stream 78 is distinct from the first air stream 20. The stream temperature of the first air stream 20 is distinct from a second stream temperature. The second air steam may have a second air stream temperature and a second air stream flow rate effective to maintain the ambient temperature of the vehicle cabin 14 higher than the comfortable temperature of 24° C. when the HVAC system 10 is cooling the vehicle cabin 14 and to maintain the ambient temperature of the vehicle cabin 14 lower than 24° C. when the HVAC system 10 is heating the vehicle cabin 14.

The controller 28 may be configured to decrease the stream temperature of the first air stream 20 and increase the second air stream 78 temperature effective to decrease energy consumed by the HVAC system 10 when energy available to the HVAC system 10 for cooling is reduced. Alternatively, the controller 28 may be configured to increase the stream temperature of the first air stream 20 and decrease the second air stream 78 temperature effective to decrease energy consumed by the HVAC system 10 when energy available to the HVAC system 10 for heating is reduced. As a non-limiting example, electrical energy available to the HVAC system 10 to cool the occupant 12 may be limited in order to improve the driving range of the electric vehicle. Therefore, the controller 28 may increase the second air stream 78 temperature to reduce the electrical energy required to maintain the ambient temperature in the vehicle cabin 14. The controller 28 may then decrease the first air stream 20 temperature in order to establish the desired heat supply rate of the sensitive portion 30. The electrical energy reduction realized by increasing the second stream temperature may be greater than the electrical energy increase realized by decreasing the stream temperature of the first air stream 20, thereby providing a net energy savings to the HVAC system 10 that may be used by the electrical drive system to improve the EV driving range while still maintaining a comfortable thermal environment for the occupant 12. Similar energy savings may also be realized in IC engine vehicles wherein the energy for the HVAC system 10 is derived from the IC engine.

The controller 28 may be configured to increase the flow rate of the first air stream 20 and increase the second air stream 78 temperature effective to decrease energy consumed by the HVAC system 10 when energy available to the HVAC system 10 for cooling is reduced. Alternatively, the controller 28 may be configured to increase the flow rate of the first air stream 20 and decrease the second air stream 78 temperature effective to decrease energy consumed by the HVAC system 10 when energy available to the HVAC system 10 for heating is reduced. As a non-limiting example, electrical energy available to the HVAC system 10 to cool the occupant 12 may be limited in order to improve the driving range of the electric vehicle. Therefore, the controller 28 may increase the second air stream 78 temperature to reduce the electrical energy required to maintain the ambient temperature in the vehicle cabin 14. The controller 28 may also increase the flow rate of the first air stream 20 in order to establish the desired heat supply rate for the sensitive portion 30. The electrical energy reduction realized by increasing the second stream temperature may be greater than the electrical energy increase realized by increasing the flow rate of the first air stream 20, thereby providing a net energy savings to the HVAC system 10 that may be used by the electrical drive system to improve the EV driving range while still maintaining a comfortable thermal environment for the occupant 12.

The controller 29 may be configured to decrease a flow rate of the second air stream 78 effective to decrease energy consumed by the HVAC system 10 when energy available to the HVAC system 10 is reduced.

The system 10 may further include a plurality of nozzles configured to direct a plurality of streams of air from the HVAC system 10 to a plurality of sensitive portions. In a non-limiting example the head nozzle 18 may deliver the head air stream 20 to the head portion 64 while the lap nozzle 72 delivers the lap air stream 74 to the lap portion 70 and the chest nozzle 66 delivers the chest air stream 68 to the chest portion 34.

A flow rate of at least one stream in the plurality of streams of air may be reduced effective to decrease energy consumed by the HVAC system 10 when energy available to the HVAC system 10 is reduced. The flow rate of at least one stream may be reduced to no flow in order to decrease energy consumed by the HVAC system 10. In a non-limiting example, electrical energy available to the HVAC system 10 to cool the occupant 12 may be limited in order to improve the driving range of the electric vehicle. Therefore, in a heating, ventilation, and air conditioning system 10 with a head nozzle 18, a chest nozzle 66 and a lap nozzle 72, the controller 28 may reduce the flow rate of the lap air stream 74, since the lap portion 70 is the least sensitive portion of the body of the occupant 12 that is being spot conditioned. As the energy available to the HVAC system 10 is further reduced, the controller 28 may stop the lap air stream 74 and reduce the flow rate of the chest air stream 68 since the chest portion 34 is less sensitive than the head portion 64. As the energy available to the HVAC system 10 is yet further reduced, the controller 28 may stop the chest air stream 68 while still providing the head air stream 20. This may beneficially provide a net energy savings to the HVAC system 10 that may be used by the electrical drive system to improve the EV driving range while providing spot conditioning to the most thermally sensitive portion of the body of the occupant 12, the head portion 64.

The system 10 may further include a plurality of nozzles configured to direct a plurality of streams of air from the HVAC system 10 to a plurality of seating locations within the vehicle cabin 14. The system 10 may further include an occupant sensor in communication with the controller 28 and configured to determine whether an occupant 12 is sitting in a particular seating location. If the controller 28 determines that a seating location is unoccupied, the controller 28 will stop the air streams from the nozzles directed to that seating location.

Figure 8:
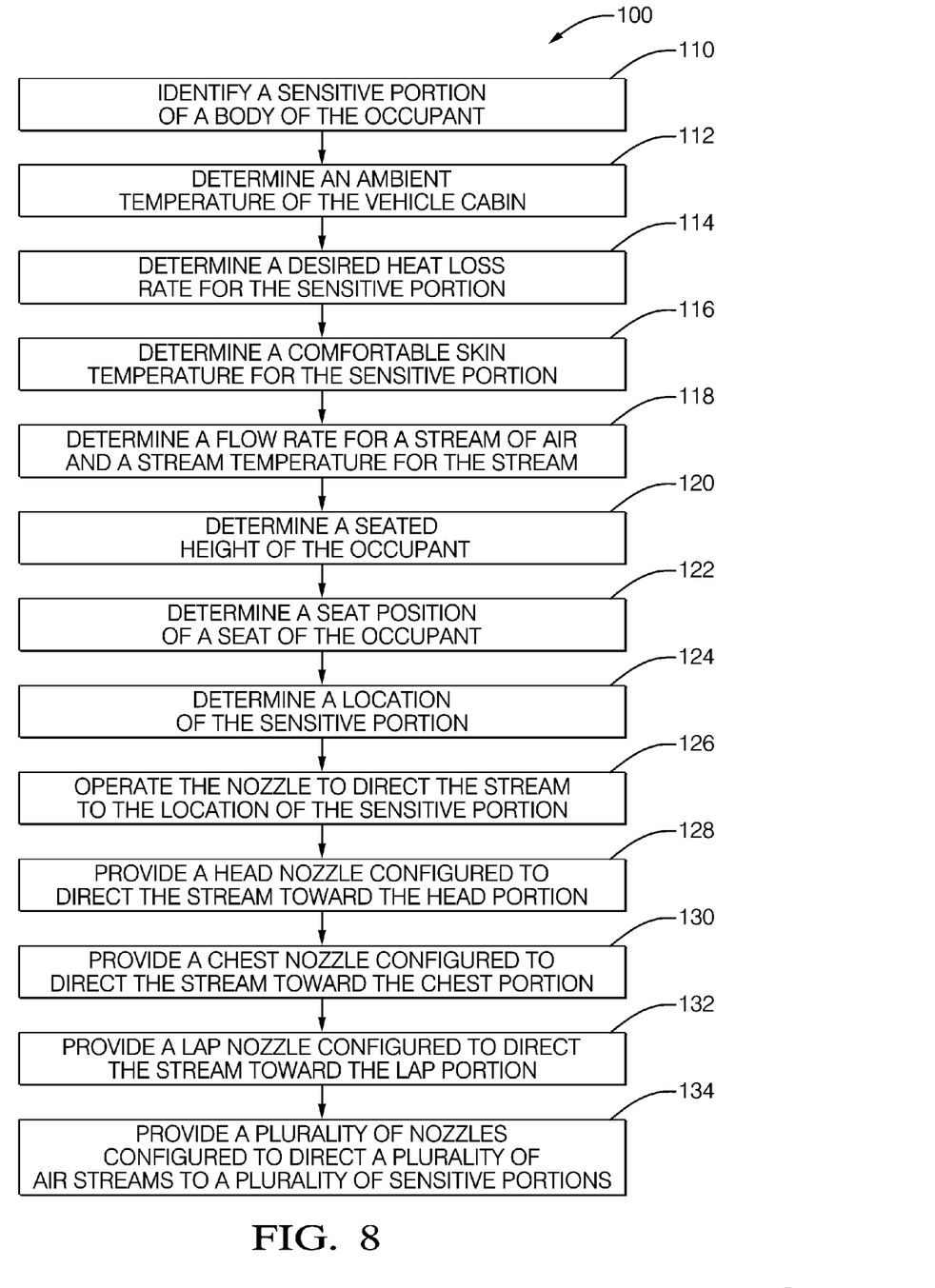
FIG. 8 is a flow diagram of a method for controlling an HVAC system in accordance with another embodiment.

FIG. 8 illustrates a non-limiting method 100 of controlling a heating, ventilation, and air conditioning system 10 to provide a perceived comfortable ambient environment to an occupant 12 seated in a vehicle cabin 14.

Step 110, IDENTIFY A SENSITIVE PORTION OF A BODY OF THE OCCUPANT, may include identifying a portion of the body of the occupant 12 that is more sensitive to heat loss than other portions of the body. Identification of the sensitive portion 30 may be based on models of the human body such as the Human Thermal Comfort Model developed by Zhang et al., ibid to determine thermal comfort sensitivity of body portions to the ambient temperature. Step 110, IDENTIFY A SENSITIVE PORTION OF A BODY OF THE OCCUPANT, may be based on a database of temperature sensitivity of various body portions.

Step 112, DETERMINE AN AMBIENT TEMPERATURE OF THE VEHICLE CABIN, may include determining an ambient temperature of the vehicle cabin 14. The method 100 may further include disposing a temperature sensor 52 within the vehicle cabin 14. The temperature sensor 52 may be configured to measure the ambient air temperature within the cabin 14.

Step 114, DETERMINE A DESIRED HEAT SUPPLY RATE FOR THE SENSITIVE PORTION, may include determining a desired heat supply rate for the sensitive portion 30. The desired heat supply rate may include a steady-state heat supply rate based on a difference between a comfortable heat loss rate for the sensitive portion 30 and an actual heat loss rate for the sensitive portion 30 at the ambient temperature. The desired heat supply rate may further include a transient heat supply rate for the sensitive portion 30. The transient heat supply rate may diminish in magnitude based on an elapsed time since a system start event.

Step 116, DETERMINE A COMFORTABLE SKIN TEMPERATURE FOR THE SENSITIVE PORTION, may include determining a comfortable skin temperature for the sensitive portion 30. The comfortable skin temperature may also be based on models of the human body such as the Human Thermal Comfort Model developed by Zhang et al., ibid. Step 116, DETERMINE A COMFORTABLE SKIN TEMPERATURE FOR THE SENSITIVE PORTION, may be based on a database of comfortable skin temperature for various body portions.

Step 118, DETERMINE A FLOW RATE FOR A STREAM OF AIR AND A STREAM TEMPERATURE FOR THE STREAM, may include determining a flow rate for a stream of air and a stream temperature for the stream based on at least the desired heat supply rate, the comfortable skin temperature, a discharge area of a nozzle, a dispersion angle of the nozzle, and a distance from the nozzle to the sensitive portion 30. The steady state heat supply rate may be increased and the flow rate for the stream of air may be decreased the when energy available to the HVAC system is reduced.

Step 124, DETERMINE A LOCATION OF THE SENSITIVE PORTION, may include determining a location of the sensitive portion 30. The determination may be based on location information regarding the sensitive body portions in relation to the nozzle, as a non-limiting example azimuth and distance information. The location information may be generalized so that the location information encompasses the location of the sensitive portion 30 of a female occupant in the $10^{th}$ percentile of height and a male occupant in the $90^{th}$ percentile of height.

Step 120, DETERMINE A SEATED HEIGHT OF THE OCCUPANT, may include determining a seated height of the occupant 12. Step 124, DETERMINE THE LOCATION OF THE SENSITIVE PORTION, may include determining the location of the sensitive portion 30 based on the seated height. The determination of the location of the sensitive portion 30 may be based on determining the seated height of the occupant 12 by comparing anthropometric data, such as that contained in Chapter 11 of "Human Engineering Guide to Equipment Design", ibid. The method 100 may also include a step of disposing a sensor 54 that is configured to determine a seated height of the occupant within the vehicle cabin 14.

Step 122, DETERMINE A SEAT POSITION OF A SEAT OF THE OCCUPANT, may include determining a seat position of a seat of the occupant 12 and Step 124, DETERMINE THE LOCATION OF THE SENSITIVE PORTION, may include determining the location of the sensitive portion 30 based on the seat position.

Step 126, OPERATE THE NOZZLE TO DIRECT THE STREAM TO THE LOCATION OF THE SENSITIVE PORTION, may include operating the nozzle to deliver the stream to the location of the sensitive portion 30. The nozzle may be articulated to aim the stream toward the location of the sensitive portion. The stream may be characterized as having the stream temperature and the flow rate necessary to establish the desired heat supply rate at the sensitive portion 30.

Step 128, PROVIDE A HEAD NOZZLE CONFIGURED TO DIRECT THE STREAM TOWARD THE HEAD PORTION, may include providing a head nozzle 18 configured to direct the stream toward the head portion 64. The sensitive portion of steps 110, 114, 116, 124, and 126 may be a head portion 64. The head nozzle 18 may be characterized as having a head nozzle discharge area between 1.25 and 12 square centimeters, a head nozzle to head portion distance between 4 times a nozzle equivalent diameter and 10 times the nozzle equivalent diameter, a head nozzle flow rate between 0.9 liters per second (2 CFM) and 3.3 liters per second (7 CFM), and a head nozzle stream temperature between 22° C. and 26° C.

Step 130, PROVIDE A CHEST NOZZLE CONFIGURED TO DIRECT THE STREAM TOWARD THE CHEST PORTION, may include providing a chest nozzle 66 configured to direct the stream toward the chest portion 34. The sensitive portion of steps 110, 114, 116, 124, and 126 may be a chest portion 34. The chest nozzle 66 may be characterized as having a chest nozzle discharge area between 1.25 and 20 square centimeters, a chest nozzle to chest portion distance between 8 times a nozzle equivalent diameter and 15 times the nozzle equivalent diameter, a chest nozzle flow rate between 3.8 liters per second (8 CFM) and 7.6 liters per second (15 CFM), and a chest nozzle stream temperature between 22° C. and 26° C.

Step 132, PROVIDE A LAP NOZZLE 72 CONFIGURED TO DIRECT THE STREAM TOWARD THE LAP PORTION, may include the step of providing a lap nozzle 72 configured to direct the stream toward the lap portion 70. The sensitive portion 30 of steps 110, 114, 116, 124, and 126 may be a lap portion 70. The lap nozzle 72 may be characterized as having a lap nozzle discharge area between 10 and 45 square centimeters, a lap nozzle to lap portion distance between 8 times a nozzle equivalent diameter and 15 times the nozzle equivalent diameter, a lap nozzle flow rate between 2.3 liters per second (5 CFM) and 9.5 liters per second (20 CFM), and a lap nozzle stream temperature between 22° C. and 26° C.

Step 134, PROVIDE A PLURALITY OF NOZZLES CONFIGURED TO DIRECT A PLURALITY OF STREAMS OF AIR TO A PLURALITY OF SENSITIVE PORTIONS, may include the step providing a plurality of nozzles configured to direct a plurality of streams of air from the HVAC system to a plurality of sensitive portions. The desired heat supply rate for a more sensitive portion may be increased and the desired heat supply rate for a less sensitive portion may be decreased. The more sensitive portion may be over conditioned by providing a heat supply rate for the sensitive portion greater than the steady-state heat supply rate to achieve overall thermal comfort. The desired heat supply rate for the less sensitive portion may be decreased by reducing or eliminating the flow rate of the air stream directed to the less sensitive portion.

Accordingly, a heating, ventilation, and air conditioning system 10 and a method 100 of controlling a HVAC system 10 that is configured to provide a perceived comfortable ambient environment to an occupant 12 seated in a vehicle cabin 14 is provided. The system 10 and method 100 determine the location of a thermally sensitive portion 30 of the body of the occupant 12 and spot condition the sensitive portion 30 by delivering an air stream to that sensitive portion 30 that has a temperature and a flow rate that effectively thermally isolates the sensitive portion 30 from the ambient temperature of the vehicle cabin 14. Thus, it may be possible to save energy required by the HVAC system 10 by maintaining the vehicle cabin 14 at an ambient temperature higher or lower than is typically required for occupant 12 comfort.

While this invention has been described in terms of the preferred embodiments thereof, it is not intended to be so limited, but rather only to the extent set forth in the claims that follow. Moreover, the use of the terms first, second, etc. does not denote any order of importance, but rather the terms first, second, etc. are used to distinguish one element from another. Furthermore, the use of the terms a, an, etc. do not denote a limitation of quantity, but rather denote the presence of at least one of the referenced items.

We claim:

1. A heating, ventilation, and air conditioning (HVAC) system configured to provide a perceived comfortable ambient environment to an occupant seated in a vehicle cabin, said system comprising:
   a first nozzle configured to direct a first air stream from the HVAC system;
   a servo mechanism coupled to the first nozzle configured to articulate the first nozzle in order to direct the first air stream to a desired location; and
   a controller in communication with the servo mechanism, said controller configured to
   determine a seated position of the occupant,
   identify a sensitive portion of a body of the occupant that is more sensitive to heat loss than other portions of the body,
   determine an ambient temperature of the vehicle cabin,
   determine a desired heat supply rate for the sensitive portion, wherein the desired heat supply rate includes a steady-state heat supply rate based on a difference between a comfortable heat loss rate for the sensitive portion and an actual heat loss rate for the sensitive portion at the ambient temperature, wherein the desired heat supply rate includes a transient heat supply rate based on ambient temperature, and wherein the transient heat supply rate diminishes in magnitude from an initial transient heat supply rate to a reduced steady state heat supply rate based on an elapsed time since a system start event while the occupant remains seated;
   determine a comfortable skin temperature for the sensitive portion,
   determine a flow rate for the first air stream and a stream temperature for the first air stream based on at least the desired heat supply rate, the comfortable skin temperature, a discharge area of a nozzle, a dispersion angle of the nozzle, and a distance from the first nozzle to the sensitive portion,
   determine a location of the sensitive portion, and
   operate the servo mechanism to articulate the first nozzle in order to direct the first air stream to the location of the sensitive portion, said first air stream characterized as having the stream temperature and the flow rate necessary to establish the desired heat supply rate for the sensitive portion.

2. The system of claim 1, wherein the controller includes a database of temperature sensitivity of various body portions.

3. The system of claim 1, wherein the controller includes a database of comfortable skin temperature for various body portions.

4. The system of claim 1, wherein the system further comprises a sensor configured to determine a seated height of the occupant, wherein the sensor is in communication with the controller, wherein the controller is configured to determine the location of the sensitive portion based on the seated height indicated by the sensor.

5. The system of claim 1, wherein the system further comprises a sensor configured to determine a first seat position of a seat of the occupant, wherein the sensor is in communication with the controller, wherein the controller is configured to determine the location of the sensitive portion based on the first seat position indicated by the sensor.

6. The system of claim 1, wherein the controller is configured to determine that a seat has moved from a first seat position to a second seat position and determine a second location of the sensitive portion based on the second seat position.

7. The system of claim 1, wherein the system further comprises: a plurality of nozzles configured to direct a plurality of streams of air from the HVAC system to a plurality of sensitive portions, wherein a flow rate of at least one stream in the plurality of streams of air is reduced effective to decrease energy consumed by the HVAC system when energy available to the HVAC system is reduced.

8. A method of controlling a heating, ventilation, and air conditioning (HVAC) system to provide a perceived comfortable ambient environment to an occupant seated in a vehicle cabin, said method comprising the steps of:
   determining a seated position of the occupant;
   identifying a sensitive portion of a body of the occupant that is more sensitive to heat loss than other portions of the body;
   determining an ambient temperature of the vehicle cabin;
   determining a desired heat supply rate for the sensitive portion, wherein the desired heat supply rate includes a steady-state heat supply rate based on a difference between a comfortable heat loss rate for the sensitive portion and an actual heat loss rate for the sensitive portion at the ambient temperature, wherein the desired heat supply rate includes a transient heat supply rate based on ambient temperature, and wherein the transient heat supply rate diminishes in magnitude from an initial transient heat supply rate to a reduced steady state heat supply rate based on an elapsed time since a system start event while the occupant remains seated;
   determining a comfortable skin temperature for the sensitive portion;
   determining a flow rate for a stream of air and a stream temperature for the stream based on at least the desired heat supply rate, the comfortable skin temperature, a discharge area of a nozzle, a dispersion angle of the nozzle, and a distance from the nozzle to the sensitive portion; and
   operating the nozzle to direct the stream to the location of the sensitive portion, said stream characterized as having the stream temperature and the flow rate necessary to establish the desired heat supply rate for the sensitive portion.

9. The method of claim 8, wherein the step of identifying the sensitive portion is based on a database of temperature sensitivity of various body portions.

10. The method of claim 8, wherein the step of determining the comfortable skin temperature for the sensitive portion is based on a database of comfortable skin temperature for various body portions.

11. The method of claim 8, said method further including the steps of: determining a seat position of a seat of the occupant; and determining the location of the sensitive portion based on the seat position.

12. The method of claim 8, said method further including the steps of: providing a plurality of nozzles configured to direct a plurality of streams of air from the HVAC system to a plurality of sensitive portions, wherein the desired heat supply rate for a more sensitive portion is increased and the desired heat supply rate for a less sensitive portion is decreased.

13. The system (10) of claim 1, wherein the sensitive portion (30) is a head portion (64), and the first nozzle (18) is a head nozzle (18), wherein the head nozzle (18) is characterized as having
   a head nozzle discharge area between 1.25 and 12 square centimeters, a head nozzle to head portion distance between 4 times a nozzle equivalent diameter and 10 times the nozzle equivalent diameter, a head nozzle flow rate between 0.9 liters per second and 3.3 liters per second, and a head nozzle stream temperature between 22° C. and 26° C.

14. The system (10) of claim 1, wherein the sensitive portion (30) is a chest portion (34), and the first nozzle (18) is a chest nozzle (66), wherein the chest nozzle (66) is characterized as having a chest nozzle discharge area between 1.25 and 20 square centimeters, a chest nozzle to chest portion distance between 8 times a nozzle equivalent diameter and 15 times the nozzle equivalent diameter, a chest nozzle flow rate between 3.8 liters per second and 7.6 liters per second, and a chest nozzle stream temperature between 22° C. and 26° C.

15. The system (10) of claim 1, wherein the sensitive portion (30) is a lap portion (70), and the first nozzle (18) is a lap nozzle (72), wherein the lap nozzle is characterized as having a lap nozzle discharge area between 10 and 45 square centimeters, a lap nozzle to lap portion distance between 8 times a nozzle equivalent diameter and 15 times the nozzle equivalent diameter, a lap nozzle flow rate between 2.5 liters per second and 14.5 liters per second, and a lap nozzle stream temperature between 22° C. and 26° C.

16. The method (100) of claim 8, wherein the sensitive portion (30) is a head portion (64), said method (100) further including the step of providing a head nozzle (18) configured to direct the stream toward the head portion (64), said head nozzle (18) characterized as having a head nozzle discharge area between 1.25 and 12 square centimeters, a head nozzle to head portion distance between 4 times a nozzle equivalent diameter and 10 times the nozzle equivalent diameter, a head nozzle flow rate between 0.9 liters per second and 3.3 liters per second, and a head nozzle stream temperature between 22° C. and 26° C.

17. The method (100) of claim 8, wherein the sensitive portion (30) is a chest portion (34), said method (100) further including the step of providing a chest nozzle (66) configured to direct the stream toward the chest portion (130), said chest nozzle (66) characterized as having a chest nozzle discharge area between 1.25 and 20 square centimeters, a chest nozzle to chest portion distance between 8 times a nozzle equivalent diameter and 15 times the nozzle equivalent diameter, a chest nozzle flow rate between 3.8 liters per second and 7.6 liters per second, and a chest nozzle stream temperature between 22° C. and 26° C.

18. The method (100) of claim 8, wherein the sensitive portion is a lap portion (70), said method (100) further including the step of providing a lap nozzle (72) configured to direct the stream toward the lap portion (70), said lap nozzle (72) characterized as having a lap nozzle discharge area between 10 and 45 square centimeters, a lap nozzle to lap portion distance between 8 times a nozzle equivalent diameter and 15 times the nozzle equivalent diameter, a lap nozzle flow rate between 2.5 liters per second and 14.5 liters per second, and a lap nozzle stream temperature between 22° C. and 26° C.

* * * * *